United States Patent [19]

Massey et al.

[11] Patent Number: 4,559,966

[45] Date of Patent: Dec. 24, 1985

[54] VALVE HANDLE WITH SELECTABLE STOPS

[75] Inventors: Roger G. Massey, Exeter; David G. Holloway, Concord, both of N.H.

[73] Assignee: The Parker & Harper Manufacturing Company, Worcester, Mass.

[21] Appl. No.: 702,341

[22] Filed: Feb. 15, 1985

[51] Int. Cl.⁴ ............................................. F16K 31/60
[52] U.S. Cl. .................................... 137/270; 251/285; 251/288
[58] Field of Search ............... 137/270, 260; 251/288, 251/285

[56] References Cited

U.S. PATENT DOCUMENTS

| | | | |
|---|---|---|---|
| 3,744,752 | 7/1973 | Massey | 251/288 X |
| 4,046,350 | 9/1977 | Massey | 137/269 X |
| 4,193,579 | 3/1980 | Massey | 251/288 |

FOREIGN PATENT DOCUMENTS 19570 of 1914 United Kingdom ............... 251/288

Primary Examiner—Alan Cohan
Attorney, Agent, or Firm—Thomas N. Tarrant

[57] ABSTRACT

Handle assemblies for fluid control valves are described that can be operated from various positions and in either direction of rotation to open and close 90° operating valves. A detenting element passes through a selectable one of a plurality of notches in a handle arm to engage fixed stops on the valve and sets limits at various positions depending on the selected notch.

5 Claims, 6 Drawing Figures

U.S. Patent   Dec. 24, 1985   Sheet 1 of 2   4,559,966
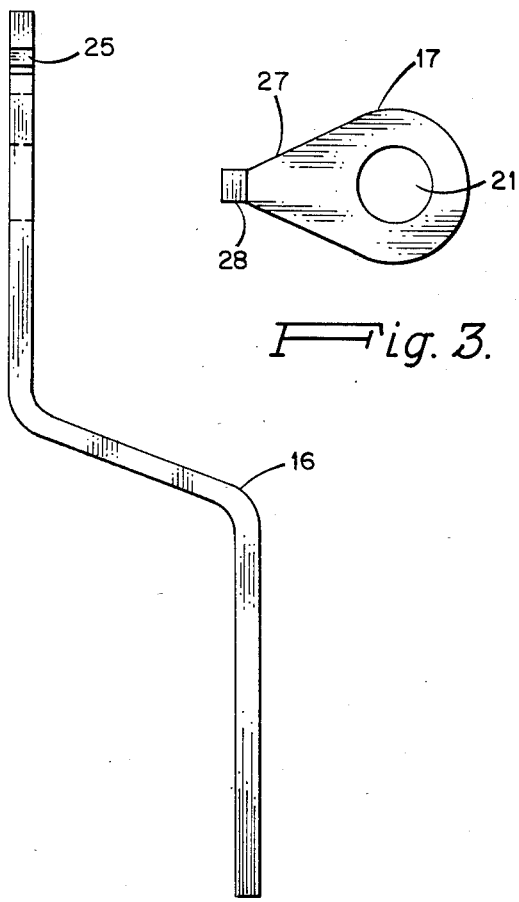
Fig. 4.
Fig. 3.
Fig. 2.
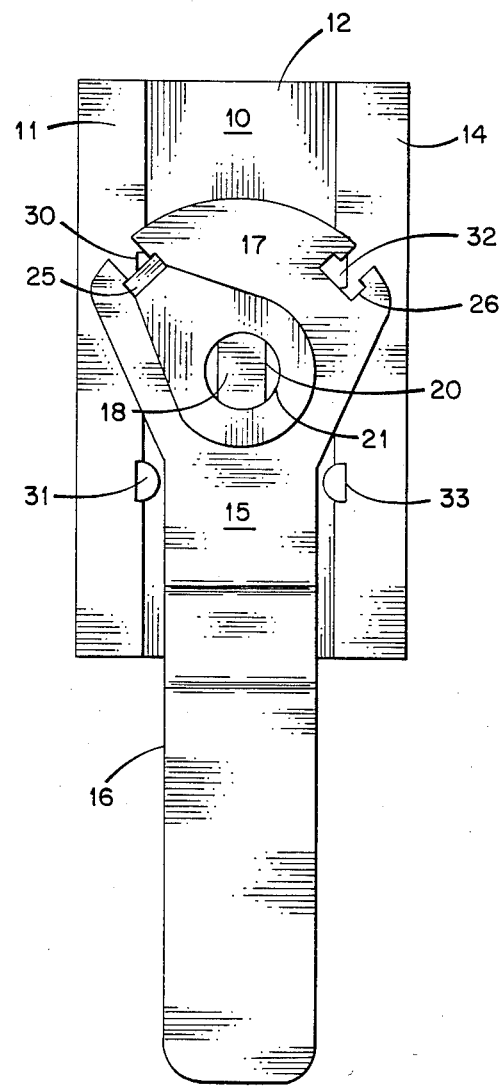
Fig. 1.

VALVE HANDLE WITH SELECTABLE STOPS

BACKGROUND OF THE INVENTION

1. Field of the Invention

The present invention relates to fluid control valves which go from full closed to full open by a 90° rotation of a control element and in particular the invention relates to handles for operating such valves.

2. Relation to the Prior Art

The handle of a valve is the interface with the user and thus acquires a greater significance then might at first be expected. Users in turn keep coming up with different preferences. Some want clockwise rotation for "ON" while others want counterclockwise. Some want a handle extending to the left and others to the right. U.S. Pat. No. 3,744,752, assigned to the assignee of the present invention, discloses a fluid control valve with a detachable handle. The basic detenting arrangement for establishing rotational limits is simple and reliable. Stop recesses in the valve body coact with a dog depending from the handle. Placing corresponding stop recesses on the opposite side of the valve body is an obvious step for enabling reversal of the handle. This still does not give the additional flexibility of being able to change the direction of rotation for going from the closed to the open condition and vice versa. U.S. Pat. No. 4,046,350 also assigned to the present assignee discloses a valve operating assembly that does enable reversed rotation. The arrangement disclosed in that patent is, however, designed for power actuation and is complex and relatively expensive of implementation.

SUMMARY OF THE INVENTION

The present invention provides a detenting arrangement for fluid control valve enabling reversal of rotational direction in going from open to closed. Thus, in a fluid control valve having a valve body, a rotatable valve element in said body that opens and closes a fluid passage through the body by a 90° rotation, stops in said body for determining limit positions of rotation and a handle assembly for rotating said element, the combination is said handle assembly of (1) a manually rotatable arm having a first aperture for receiving a shaft that rotates the valve element and at least two additional apertures at 90° spaced locations on an arc concentric around said first aperture; and (2) a detenting device having a central aperture for receiving said shaft together with said arm and having a detenting dog positionable through a selected one of said additional apertures to coact with said stops so as to define rotational limits for said handle assembly, at least one of said arm and said detenting device mating fixedly with said shaft preventing relative movement between the shaft and the handle assembly.

Further objects and features of the invention will become apparent upon reading the following disclosure together with the drawing.

BRIEF DESCRIPTION OF THE DRAWING

FIG. 1 is a plan view of a valve with a handle assembly according to the invention;

FIG. 2 is a side elevation of the handle arm of FIG. 1;

FIG. 3 is a plan view of the detent device of FIG. 1;

FIG. 4 is a side elevation of the detent device of FIG. 1;

DESCRIPTION OF THE PREFERRED EMBODIMENTS

Figure 5:
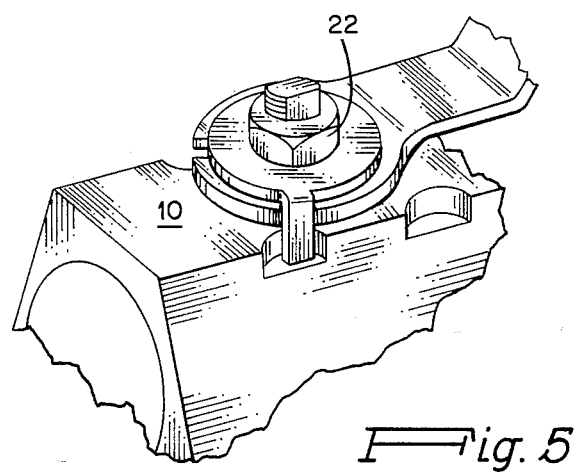
FIG. 5 is an isometric view of a portion of a valve assembly in accordance with a second embodiment of the invention.

The handle assembly of the present invention is of particular value in use with field control valves having a flow control element that opens and closes by substantially a 90° rotation. It must be recognized that this 90° rotation designation is used to identify a type of valve and that in fact some of the class of valve operate with a little more or less than 90° rotation. Thus 90° as used herein is intended to include such variations as are commonly used in the class of valve. Typical valves in this class are ball valves, butterfly valves and plug valves. For purposes of description only, the valve will be assumed as a ball valve in which (in the absence of detents) the ball could rotate continuously opening and closing the fluid path every 90°. The invention provides a handle and detent element combination that allows either the open or the closed position to be detented at any one of four 90° spaced positions.

Fig. depicts a valve assembly in which valve body 10 is hexagonal in cross-section with surfaces 11, 12 and 14 showing. Handle assembly 15 includes arm 16 and detent device 17. In addition, valve stem 18 is depicted where it passes through apertures 20 and 21 in arm 16 and device 17 respectively. Valve stem 18 has flattened sides and is threaded in the manner depicted in FIG. 6. Nut 22 (see FIG. 5) has been left off in FIG. 1 for purposes of illustration. Nut 22 holds handle assembly 15 on stem 18. Aperture 20 in arm 16 is generally rectangular mating with the flat sides of stem 18 so that the two are locked together. Thus rotation of arm 16 also rotates valve stem 18. Detent device 17 has a circular aperture 21 so that it can be rotated on valve stem 18.

Arm 16 has two notches 25 and 26 located in an arc about aperture 20 and spaced 90° apart on that arc. Detent device 17 as depicted in FIGS. 1, 3 and 4 has the form of a washer with an extended tab 27 bent at its end to form dog 28. Dog 28 is configured to pass through a selected one of notches 25 and 26. Valve body 10 has two notches, 30 and 31 at the junctures of surfaces 11 and 12 and two more notches, 32 and 33 at the junctures of surfaces 12 and 14. Notches 30 through 33 are located on a circle about stem 18 having a radius substantially the same as the radius from stem 18 to notches 25 and 26. Notches 30 through 33 are stops mating with dog 28.

FIGS. 2, 3 and 4 show different views of arm 16 and detent device 17 of FIG. 1. Arm 16 and device 17 as shown are made from sheet metal. They can as easily be cast or shaped and sized quite differently. Since device 17 interlocks with handle 16 at notches 25 and 26, detent device 17 can have the shaped aperture for holding the fixed relation with stem 18 while the aperture in arm 16 could then be circular. Also notches 25 and 26 can take any of several configurations. They can be closed apertures through which dog 28 fits or they can be open slots as in FIGS. 5 and 6. Either closed apertures or notches as in FIG. 1 give additional support to dog 28. Notches 25 and 26 in FIG. 1 are narrower than dog 28 on the outer side so as to prevent dog 28 from bending outward.

Figure 6:
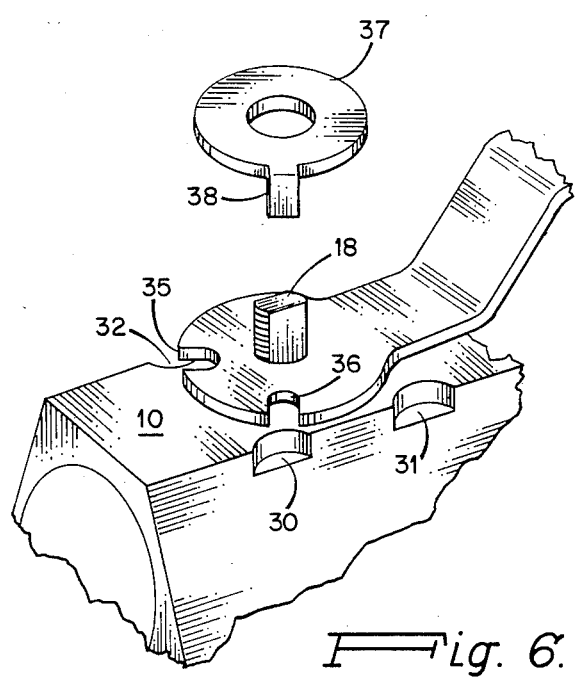
FIG. 6 is an isometric view of the assembly of FIG. 5 partially exploded to show the assembly of the handle arm and detent device.

In the embodiment of FIGS. 5 and 6, a simplified version is shown with notches 35 and 36 completely open slots. Detent device 37 is a round washer with an extending leg bent to form dog 38.

By disassembling detent device 17 and rotating it to the other notch (26) in arm 16, the direction of rotation from "open" to "closed" is reversed. Arm 16 may also be reversed by taking if off stem 18 and reinstalling it at a 180' rotation. Again the direction of rotation for opening and closing can be either clockwise or counterclockwise depending on the position of detent device 17.

While the invention has been described with respect to specific embodiments, variations are contemplated as within the scope of the invention. For example, notches can be placed at different or additional locations in arm 16 to provide stop locations is not parallel with or a right angles to the valve axis. Thus it is the intention to cover the invention as set forth within the scope of the accompanying claims.

We claim:

1. In a fluid control valve having a valve body, a rotatable valve element that opens and closes a fluid passage through the body by substantially 90° rotation, detent locations for determining limit positions of rotation and a handle assembly for rotating said element, the combination in said handle assembly comprising:
   (a) a manually rotatable arm having a first aperture for receiving a stem shaft of said valve element and having at least two notches at spaced locations in an arc at a predetermined radius from said first aperture; and,
   (b) a detenting device having a second aperture for receiving said stem shaft together with said arm and having a detent dog positionable through a selected one of said notches to coact with said detent stop locations so as to define rotational movement limits of said handle, whereby the rotational limit positions of said handle can be changed by changing the notch through which said dog is positioned.

2. In a fluid control valve according to claim 1, the combination in said handle assembly wherein said notches are positioned 90° apart.

3. In a fluid control valve according to claim 1, the combination in said handle assembly wherein said notches have outer constrictions restricting outward bending of said dogs.

4. In a fluid control valve according to claim 1, the combination in said handle assembly wherein said first aperture is shaped to mate in fixed relation with said stem shaft and said second aperture is shaped to mate in free rotational relation with said stem shaft.

5. In a fluid control valve according to claim 1, the combination in said handle assembly wherein said first aperture is shaped to mate with said stem shaft in either of two 180° related positions.

* * * * *